United States Patent
Joshi et al.

(10) Patent No.: US 10,296,317 B2
(45) Date of Patent: May 21, 2019

(54) CONTINUOUS PUBLICATION OF APPLICATION TO REMOTE COMPUTING DEVICES

(75) Inventors: Madhur Joshi, Kirkland, WA (US); Crystal Hoyer, Seattle, WA (US); David Cox, Redmond, WA (US); Mohammed Parvez Shaikh, Bellevue, WA (US); Emily B. Repperger, Sammamish, WA (US); Yamini Jagadeesan, Redmond, WA (US); Muhammad Bilal Aslam, Redmond, WA (US); Clea Allington, Bellevue, WA (US); Yishai Galatzer, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1349 days.

(21) Appl. No.: 12/972,566

(22) Filed: Dec. 20, 2010

(65) Prior Publication Data

US 2012/0159468 A1    Jun. 21, 2012

(51) Int. Cl.
  *G06F 8/60* (2018.01)
  *G06F 8/61* (2018.01)
  *G06F 8/65* (2018.01)
  G06F 17/30 (2006.01)

(52) U.S. Cl.
  CPC ............... *G06F 8/61* (2013.01); *G06F 8/60* (2013.01); *G06F 8/65* (2013.01); *G06F 17/3089* (2013.01)

(58) Field of Classification Search
  CPC .. H04L 67/34; H04L 67/1095; G06F 9/44505

USPC ............... 707/10; 709/207; 717/105, 168, 717/171–173, 175, 178
See application file for complete search history.

(56) References Cited

U.S. PATENT DOCUMENTS

| | | | | |
|---|---|---|---|---|
| 5,999,740 A | * | 12/1999 | Rowley | 717/173 |
| 6,006,035 A | * | 12/1999 | Nabahi | G06F 8/61 709/221 |
| 7,316,013 B2 | * | 1/2008 | Kawano et al. | 717/168 |
| 7,340,520 B1 | * | 3/2008 | Jordan | G06Q 30/04 709/201 |

(Continued)

OTHER PUBLICATIONS

IIS Team, "Package an Application for the Windows Web Application Gallery", Mar. 18, 2009, Microsoft: All pages.*

(Continued)

*Primary Examiner* — Lewis A Bullock, Jr.
*Assistant Examiner* — Gilles R Kepnang
(74) *Attorney, Agent, or Firm* — Liang IP, PLLC

(57) ABSTRACT

A particular method includes storing a manifest file and a parameters file at a data store. The manifest file and the parameters file are associated with a software deployment package. An application associated with the software deployment package is published to a first remote computing device and to a second remote computing device. The method includes receiving first parameter values from the first remote computing device and receiving second parameter values from the second remote computing device. The first parameter values are stored in a first region of the data store that is specific to the first computing device. The second parameter values are stored in a second region of the data store that is specific to the second computing device.

20 Claims, 7 Drawing Sheets

(56) References Cited

U.S. PATENT DOCUMENTS

| | | | |
|---|---|---|---|
| 7,536,686 B2* | 5/2009 | Tan | G06F 8/61 713/100 |
| 7,735,077 B2* | 6/2010 | Laird | G06F 8/71 707/610 |
| 7,818,742 B2* | 10/2010 | Laird | G06F 17/30873 717/169 |
| 7,827,546 B1* | 11/2010 | Jones | G06F 8/65 717/168 |
| 8,239,852 B2* | 8/2012 | Etchegoyen | G06F 8/60 717/168 |
| 8,261,258 B1* | 9/2012 | Jianu | G06F 8/61 717/169 |
| 9,092,243 B2* | 7/2015 | Faus | G06F 9/44505 |
| 9,110,750 B2* | 8/2015 | Somani | G06F 8/61 |
| 2002/0066073 A1* | 5/2002 | Lienhard et al. | 717/105 |
| 2002/0100036 A1* | 7/2002 | Moshir | G06F 8/62 717/173 |
| 2003/0023963 A1* | 1/2003 | Birkholz | G06F 8/65 717/172 |
| 2004/0073903 A1* | 4/2004 | Melchione | G06F 8/60 717/172 |
| 2005/0160104 A1 | 7/2005 | Meera et al. | |
| 2005/0210459 A1* | 9/2005 | Henderson et al. | 717/168 |
| 2006/0010196 A1* | 1/2006 | Laird | G06F 17/30873 709/203 |
| 2006/0069735 A1* | 3/2006 | Czeisler et al. | 709/207 |
| 2006/0123414 A1* | 6/2006 | Fors | G06F 8/61 717/177 |
| 2006/0130046 A1* | 6/2006 | O'Neill | 717/168 |
| 2006/0130054 A1* | 6/2006 | Bocking | G06F 8/61 717/173 |
| 2006/0173951 A1* | 8/2006 | Arteaga | H04L 67/1095 709/203 |
| 2007/0150478 A1* | 6/2007 | Cho et al. | 707/10 |
| 2007/0234345 A1* | 10/2007 | Kramer | G06F 8/61 717/174 |
| 2008/0040490 A1* | 2/2008 | Karlberg | G06F 8/61 709/228 |
| 2008/0201705 A1* | 8/2008 | Wookey | 717/175 |
| 2008/0301672 A1* | 12/2008 | Rao | G06F 8/61 717/177 |
| 2008/0320079 A1* | 12/2008 | Da Palma | G06F 17/3089 709/204 |
| 2009/0036105 A1* | 2/2009 | Carion | G06F 9/451 455/414.1 |
| 2009/0060178 A1* | 3/2009 | Montgomery | G06F 21/6209 380/44 |
| 2009/0064135 A1* | 3/2009 | Jimmerson | G06F 8/61 717/178 |
| 2009/0077549 A1* | 3/2009 | Sadja et al. | 717/178 |
| 2009/0158272 A1* | 6/2009 | El-Assir | G06F 8/61 717/177 |
| 2009/0265687 A1* | 10/2009 | Dhanakshirur | G06F 9/44505 717/121 |
| 2009/0271777 A1* | 10/2009 | Tow et al. | 717/171 |
| 2009/0276770 A1* | 11/2009 | Taieb | G06F 8/61 717/177 |
| 2010/0162232 A1* | 6/2010 | Bhatia | G06F 9/44526 717/178 |
| 2010/0185582 A1 | 7/2010 | Alam et al. | |
| 2010/0192146 A1 | 7/2010 | Stay | |
| 2010/0251230 A1* | 9/2010 | O'Farrell | G06F 17/30575 717/173 |
| 2010/0306762 A1* | 12/2010 | Lindberg | G06F 8/61 717/176 |
| 2010/0312817 A1* | 12/2010 | Steakley | G06F 8/61 709/202 |
| 2010/0333081 A1* | 12/2010 | Etchegoyen | G06F 8/60 717/172 |
| 2011/0016414 A1* | 1/2011 | Ernst | G06F 8/63 715/764 |
| 2011/0083069 A1* | 4/2011 | Paul | G06F 8/60 715/234 |
| 2011/0145817 A1* | 6/2011 | Grzybowski | G06F 9/44505 718/1 |
| 2011/0246981 A1* | 10/2011 | Braun | G06F 8/63 717/175 |

OTHER PUBLICATIONS

Gu, Scott, "Automating Deployment with Microsoft Web Deploy", Retrieved at << http://weblogs.asp.net/scottgu/archive/2010/09/13/automating-deployment-with-microsoft-web-deploy.aspx >>, Published Date: Sep. 13, 2010, Retrieved Date: Sep. 21, 2010, pp. 34.

"asp.net Web Application Project Deployment", Retrieved at << http://msdn.microsoft.com/en-us/library/dd394698.aspx >>, Retireved Date: Sep. 21, 2010, pp. 12.

"Chapter 9 Deploying Web Applications (Sun Java System Web Server 7.0 Developer's Guide to Java Web Applications)", Retrieved at << http://docs.sun.com/app/docs/doc/819-2634/abxfs?a=view >>, Retrieved Date: Sep. 21, 2010, pp. 10.

Streicher, Martin, "Speaking UNIX: Managing multitudes of machines the mild-mannered way", Retrieved at << http://www.ibm.com/developerworks/aix/library/au-spunix_remoteserver/index.html >>, Dated: Sep. 14, 2010, Retrieved Date: Sep. 21, 2010, pp. 8.

Thangarathinam, Thiru, "Deploying asp.net Applications—Part 1", Retrieved at << http://www.15seconds.com/issue/030806.htm >>, Retrieved Date: Sep. 21, 2010, pp. 11.

McKay, et al., "Automated Deployment of Enterprise Application Updates", Retrieved at << http://websphere.sys-con.com/node/47889 >>, SYS-CON Media, Inc., Dated: Jan. 24, 2005, Retrieved Date: Sep. 21, 2010, pp. 10.

* cited by examiner

300

```
<MSDeploy.iisApp>
  <iisapp path="MyApp" managedRuntimeVersion="v4.0" />
  <setAcl path="MyApp/App_Data" setAclAccess="Modify" />
  <setAcl path="MyApp/Media" setAclAccess="Modify" />
  <setAcl path="MyApp/Modules" setAclAccess="Modify" />
  <setAcl path="MyApp/Themes" setAclAccess="Modify" />
  <dbFullSql path="install.sql" />
</MSDeploy.iisApp>
```

MANIFEST XML FILE

*FIG. 3*

```xml
<parameters>
  <parameter name="Application Path" description="Full site path where you would like to install your
    application (i.e., Default Web Site/MyApp)" defaultValue="Default Web Site/MyApp" tags="iisapp">
    <parameterEntry type="ProviderPath" scope="iisapp" match="MyApp" />
  </parameter>
  <parameter name="SetAclParameter" description="Hidden - automatically sets write access for the
    app" defaultValue="{Application Path}/App_Data" tags="Hidden">
    <parameterEntry type="ProviderPath" scope="setAcl" match="MyApp/App_Data" />
  </parameter>
  <parameter name="Database Server" description="Location of your database server (i.e. server name, IP
    address, or server\instance)" defaultValue=".\SQLEXPRESS" tags="SQL, dbServer" />
  <parameter name="Database Name" description="Name of the database for MyApp."
    defaultValue="MyApp" tags="SQL, dbName">
    <parameterEntry type="TextFile" scope="install.sql" match="PlaceHolderForDb" />
  </parameter>
  <parameter name="Database Username" description="User name to access you application database."
    defaultValue="MyAppuser" tags="SQL, DbUsername">
    <parameterEntry type="TextFile" scope="install.sql" match="PlaceHolderForUser" />
  </parameter>
  <parameter name="Database Password" description="Password for the Database Username."
    tags="New, Password, SQL, DbUserPassword">
    <parameterEntry type="TextFile" scope="install.sql" match="PlaceHolderForPassword" />
  </parameter>
  <parameter name="Settings Data Provider for SQL" description="MyApp SQL Data Provider Setting"
    defaultValue="DataProvider: SqlServer" tags="Hidden">
    <parameterEntry kind="TextFile" scope="\\Settings\.txt$" match="DataProvider\s*:[^\r\n]*" />
  </parameter>
  <parameter name="Settings Data Connection String for SQL" description="MyApp SQL Data
    Connection String Setting" defaultValue="DataConnectionString: Server={Database
    Server};Database={Database Name};uid={Database Username};Pwd={Database Password};"
    tags="Hidden, SQL, UserConnectionString">
    <parameterEntry kind="TextFile" scope="\\Settings\.txt$"
      match="DataConnectionString\s*:[^\r\n]*" />
  </parameter>
</parameters>
```

PARAMETERS XML FILE

FIG. 4

```
<parameters>
  <setParameter name="AppPath" value="Default Web Site/wordwrite" />
  <setParameter name="DbServer" value="localhost" />
  <setParameter name="DbName" value="wordwrite" />
  <setParameter name="DbUsername" value="wordwriteuser" />
  <setParameter name="DbPassword" value="mydbpassword" />
  <setParameter name="Key1" value="YTgQUPAbkDnX" />
  <setParameter name="Key2" value="A1kf8wjyJ4bIE" />
  <setParameter name="Key3" value="q19nJd2HZi5fRZL8kwT6ufp" />
  <setParameter name="Key4" value="V1gSErdyfaIj5CisA5aDh0rCnP08gSg" />
  <setParameter name="OriginalPackageGuid" value="dsV3EoWHg4J4lXX1tLxVR4kvNg" />
</parameters>
```

ENCRYPTED DESTINATION-SPECIFIC PARAMETER VALUES

*FIG. 5*

CONTINUOUS PUBLICATION OF APPLICATION TO REMOTE COMPUTING DEVICES

BACKGROUND

Software developers often make computer programs available via the Internet. For example, instead of installing a local copy of a computer program, a user may access an Internet server (e.g., a target server) that hosts the program. Before a computer program is deployed at a target server and made accessible to others, the computer program may be developed and tested on a local computer. Once the developer is satisfied with the program, the developer may create an installation package that installs the program on the target server. Once the program is installed at the target server, the installation package is discarded.

SUMMARY

Systems and methods of "continuous" publishing of an application are disclosed. A manifest file and a parameters file of a software deployment package may be stored in a central data store. The manifest file may identify components of the application, and the parameters file may identify destination-dependent settings for the application (e.g., settings that vary depending on where the application is installed). The stored files may enable re-creation of the software deployment package and re-publication of the application. For example, when the application is published and installed to a remote computing device (e.g., a target server), a user at the remote computing device may specify device-specific values for the destination-dependent parameters identified by the parameters file. Such device-specific parameter values may be collected from each device where the application is installed and may be stored in the data store on a per-device basis. When a change (e.g., a database update, a database addition, or a bug fix) is detected in the application, the application may be re-published to the remote computing device(s). The re-published application may be configured using the previously stored device-specific parameters, thereby enabling the remote computing device to automatically update the application without re-prompting the user for device-specific configuration information. In addition, if the user modifies the value of any device-specific parameter, the modified value may be transmitted to the data store. Thus, the data store may maintain an updated record of application-specific information (e.g., manifest information and parameters information) and device-specific information (e.g., device-specific parameter values for each computing device where the application is installed).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3 is a diagram to illustrate a particular embodiment of the manifest file of HG. 1;

FIG. 4 is a diagram to illustrate a particular embodiment of the parameters file of FIG. 1;

FIG. 5 is a diagram to illustrate a particular embodiment of device-specific parameter values;

DETAILED DESCRIPTION

Figure 1:
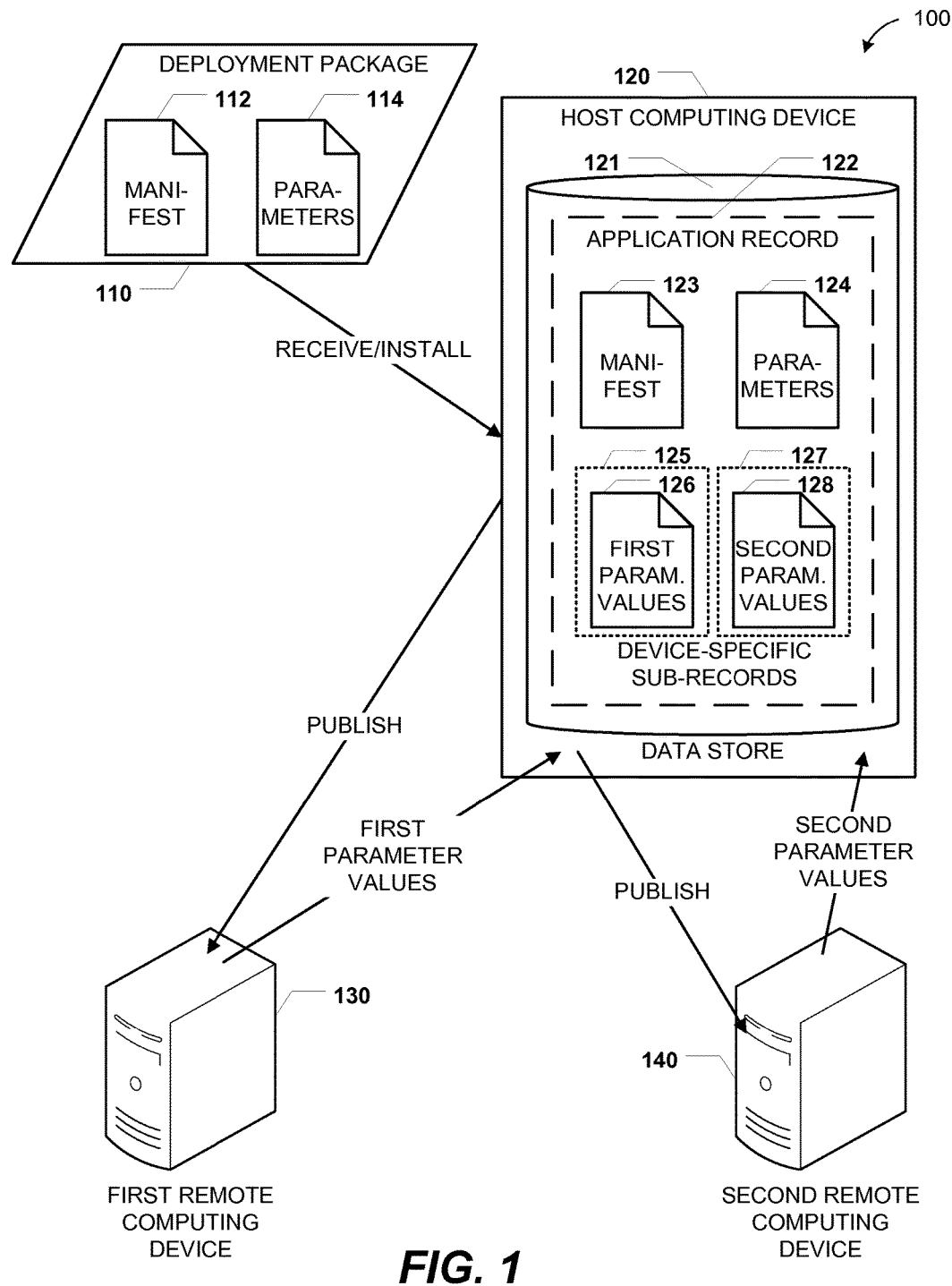
FIG. 1 is a diagram of a particular embodiment of a system of publishing an application to multiple computing devices.

The disclosed techniques may enable "continuous" publication of applications to remote computing devices. For example, manifest and parameters information of an application may be extracted from a software deployment package and may be stored at a centralized data store. The stored manifest and parameters information may enable a computing destination to serve as a publishing source that is capable of re-publishing the application to other publishing destinations. The data store may also include destination-specific parameter values for each publishing destination. For example, users at each publishing destination may provide the destination-specific values when the application is installed for the first time. When the application is subsequently modified, the modification may be propagated to the publishing destinations based on the centrally stored manifest information, the centrally stored parameters information, and the centrally stored destination-specific parameter values without prompting users for destination-specific information.

in a particular embodiment, a computer-implemented method includes storing a manifest file and a parameters file at a record (e.g., a folder) of a data store. The manifest file and the parameters file are associated with a software deployment package at a computing device. The record is specific to an application associated with the software deployment package. The method also includes publishing the application from the computing device to a first remote computing device, receiving first parameter values from the first remote computing device, and storing the first parameter values in the data store. The first parameter values are stored in a first sub-record (e.g., a sub-folder) that is specific to the first computing device. The method further includes publishing the application from the computing device to a second remote computing device, receiving second parameter values from the second remote computing device, and storing the second parameter values in the data store. The second parameter values are stored in a second sub-record that is specific to the second computing device.

In another particular embodiment, a non-transitory computer-readable storage medium includes instructions that, when executed by a computer, cause the computer to receive a software deployment package from a source computing device at a destination computing device. The software deployment package includes a manifest file identifying components of an application. The software deployment package also includes a parameters file identifying one or more destination-dependent parameters of the application. The instructions are also executable by the computer to install the application at the destination computing device and to prompt a user for values of the one or more destination-dependent parameters that are specific to the destination computing device. The instructions are further executable by the computer to transmit the values to a data store for storage.

In another particular embodiment, a computer system includes a processor and a memory that stores instructions executable by the processor to receive a software deployment package. The software deployment package includes a manifest file identifying components of an application. The software deployment package also includes a parameters file identifying one or more destination-dependent parameters of the application. The instructions are also executable to install the application and to store the manifest file and the parameters file at a data store. The instructions are further executable to publish the application to each of a plurality of remote computing devices and to receive parameter values from each of the plurality of remote computing devices. The instructions are executable to store the parameter values received from each particular remote computing device in a region of the data store that is specific to the particular computing device.

FIG. 1 is a diagram of a particular embodiment of a system 100 of publishing an application to multiple computing devices. For example, in the embodiment illustrated, a host computing device 120 may receive a software deployment package 110 associated with a particular application (e.g., web application). The host computing device 120 may publish the application to a plurality of remote computing devices (e.g., a first computing device 130 and a second computing device 140).

In a particular embodiment, the software deployment package 110 is created by a web deploy tool. The web deploy tool may be part of an integrated development environment (IDE). For example, the software deployment package 110 may be associated with an Internet information services (HS) application and may include a manifest file 112 and a parameters file 114 that are represented in extensible markup language (XML). The manifest file 112 may identify components of the web application. For example, the components may include source code files, databases (e.g., database tables, database identifiers, or any combination thereof), and access control lists (ACLs). The manifest file 112 may also include or identify an application provider and a database provider. During installation of the application at a publishing target (e.g., a target server or a target computing device), the application provider may transfer files and data identified by the manifest file 112 to the publishing target. The database provider may create databases identified by the manifest file 112 at the publishing target. An exemplary manifest file is further described with reference to FIG. 3.

The parameters file 114 may identify configuration settings of the application. For example, the parameters file 114 may identify one or more destination-dependent parameters (e.g., services connection strings, database connection strings, application paths, or any combination thereof). The values of such parameters may depend on where the application is installed. To illustrate, the application may make calls to a database when the application is executed. While the application is being developed at a developer's personal computer, the developer's personal computer may store a local instance of the database. Thus, a database connection string of the application under development may point to the local instance of the database (e.g., may refer to "localhost"). When the application is published to an application server, the published application may no longer be able to access the local instance of the database. Thus, the database connection string may be updated to refer to a different instance of the database. In this scenario, the parameters file 114 may identify the database connection string as a destination-dependent parameter. When the application is published, the parameters file 114 may be operable to cause the publishing destination to prompt a user for a destination-specific value for the database connection string. For example, during an installation procedure at a publishing destination, the publishing destination may create and present a user interface based on the parameters file 114, where the user interface may be configured to receive a value for the database connection string. In a particular embodiment, the parameters file 114 also identifies a default value for at least one destination-dependent parameter. An exemplary parameters file is further described with reference to FIG. 4.

The host computing device 120 may receive the software deployment package 110 and may install the corresponding application in accordance with the manifest file 112 and the parameters file 114. The host computing device 120 may also store the manifest file 112 and the parameters file 114, or copies thereof, at a data store 121 (e.g., as a manifest file 123 and a parameters file 124). For example, the manifest file 123 and the parameters file 124 may be stored in an application record 122 (e.g., a folder) that is specific to the application. The data store 121 may include application records for any number of applications. Each application record may be specific to a particular application. For example, when application records are represented by folders, the folder for an application may have the same name as the application. In some embodiments, the data store 121 is local to the host computing device, as illustrated in FIG. 1. Alternately, the data store 121 may be remote to the host computing device 120 and accessible via a network (e.g., a local area network (LAN) or the Internet).

The host computing device 120 may publish the application associated with the software deployment package 110 to the remote computing devices 130, 140. For example, initially publishing the application may include transmitting the components of the application identified by the manifest file 112 to the remote computing devices 130, 140. Publishing the application may also include configuring the transmitted application components based on the parameters file 114. For example, users at the remote computing device 130, 140 may be prompted for device-specific parameter values, and the components may be configured based on the device-specific parameter values. The device-specific parameter values may also be transmitted to and stored at the data store 121. For example, the application record 122 may include device-specific sub-records (e.g., sub-folders or data storage regions) 125 and 127 for each of the remote computing devices 130 and 140, respectively. To illustrate, the sub-folder specific to a computing device may be named using a domain name service (DNS) name, Internet protocol (IP) address, media access control (MAC) address, or other identifier of the computing device. Each sub-folder may include device-specific parameter values for a corresponding remote computing device (e.g., illustrative first parameter values 126 and second parameter values 128 for the remote computing devices 130 and 140, respectively). In a particular embodiment, the first parameter values 126 and the second parameter values 128 are represented in XML. Moreover, the first parameter values 126 and the second parameter values 128 may be encrypted. Exemplary parameter values are further described with reference to FIG. 5.

In a particular embodiment, the host computing device 120 is operable to detect a change in the application. For example, the change may include an update to a database used by the application or the addition of a new database. The change may also include source code modifications or data modifications associated with a hug fix or with a software update. In response to the change, the host computing device 120 may automatically update the stored manifest file 123, the stored parameters file 124, or any combination thereof. For example, the host computing device 120 may add an identifier for a new database to the manifest file 123 and may add destination-dependent parameters of the new database to the parameters file 124.

The host computing device 120 may also re-publish the application to propagate the detected change to publishing destinations (e.g., the remote computing devices 130, 140). In a particular embodiment, re-publishing an application to a publishing destination includes transmitting all application files and data to the publication destination. Alternately, re-publishing the application may include transmitting only those files that have changed since the previous publication. In addition, when an application is re-published, the application components (e.g., as defined by the stored manifest file 123) may be pre-configured based on stored parameter values. To illustrate, the application mg be re-published to the first remote computing device 130 based on the stored first parameter values 126 and re-published to the second remote computing device 140 based on the stored second parameter values 128. It will be appreciated that since re-published application components may be pre-configured for individual publishing destinations, applications may be re-published without repeatedly prompting users for device-specific configuration information.

In a particular embodiment, the data store 121 is accessible via an application programming interface (API). For example, the host computing device 120 may store and retrieve information to and from one or more of the manifest file 123, the parameters file 124, the first parameter values 126, and the second parameter values 128 via the API or via a different API. The remote computing devices 130, 140 may also communicate with the data store 121 via the API.

During operation, the host computing device 120 may receive the software deployment package 110 from a publishing source (not shown). For example, the software deployment package 110 may include the manifest file 112 and the parameters file 114, which may describe how to install and configure a web application at the host computing device 120. The host computing device 120 may install the web application based on the manifest file 112 and the parameters file 114. The host computing device 120 may also save manifest information and parameters information at the data store 121 (e.g., as the manifest file 123 and the parameters file 124). The host computing device 120 may then serve as a publishing source with respect to the remote computing devices 130, 140. For example, the host computing device 120 may publish the web application to the remote computing devices 130, 140. Each of the remote computing devices 130, 140 may transmit values for destination-dependent parameters of the web application that are stored at the data store 121. When the web application is updated, the host computing device 120 may re-publish the web application to the remote computing devices 130, 140.

It will be appreciated that the system 100 of FIG. 1 may enable continuous publication of applications. For example, a computing device (e.g., the host computing device 120) may serve as a publication destination, a publication source, or both. In addition, the system 100 of FIG. 1 may provide centralized storage of publishing data such as manifest information, parameters information, and device-specific configuration information. At any point in time, the central data store (e.g., the data store 121) may access the application-specific information (e.g., the manifest file 123 and the parameters file 124) and the device-specific information (e.g., the first parameter values 126 and the second parameter values 128) tore-publish the application. The system 100 of FIG. 1 may thus enable automated publication and re-publication of applications with reduced user intervention.

Figure 2:
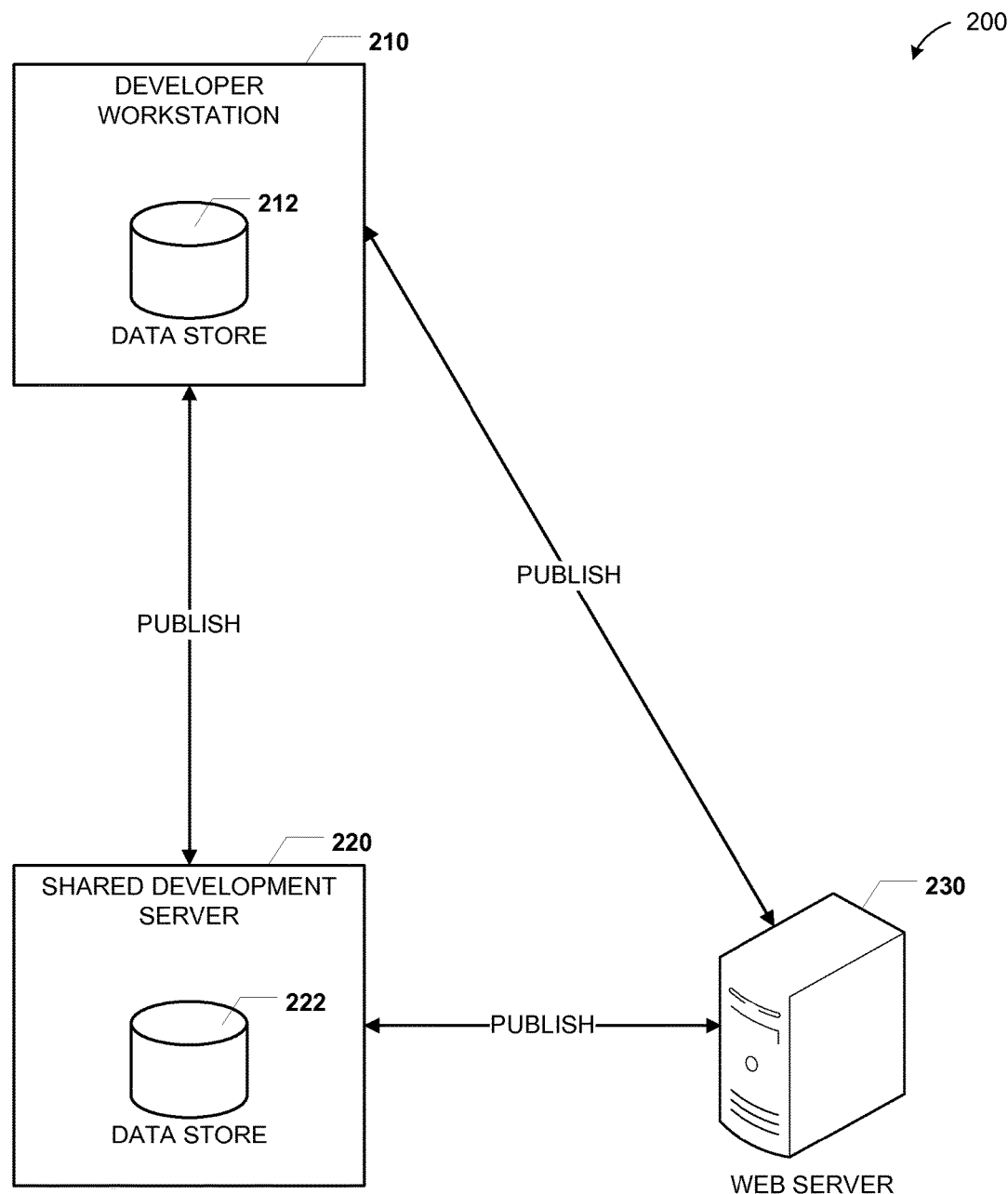
FIG. 2 is a diagram of another particular embodiment of a system of publishing an application to multiple computing devices.

FIG. 2 is a diagram of another particular embodiment of a system 200 of publishing an application to multiple computing devices. The particular embodiment of FIG. 2 is described with reference to a software development enterprise. It should be noted, however, that the systems and methods disclosed herein may apply to any type of enterprise or business workflow.

As depicted in FIG. 2, a developer workstation 210 may publish an application (e.g., a web application) to a shared development server 220. For example, the developer workstation 210 may be associated with a software developer that builds an application. When the developer is satisfied with the application, the developer may publish the application to the shared development server 220. For example, the shared development server 220 may be a team server that is available to members of a software development team to publish "alpha" and "beta" web applications for testing. In a particular embodiment, the shared development server 220 receives a software deployment package from the developer workstation 210. For example, the software deployment package may be similar to the software deployment package 110 of FIG. 1 and may include a manifest file and a parameters file similar to the manifest file 112 and the parameters file 114 of FIG. 1. The shared development server 220 may install the application and may prompt a user for parameter values that are specific to the shared development server 220. The developer workstation 210 may receive the device-specific parameter values from the shared development server 220 and may store the device-specific parameter values at a data store 212.

The application may be re-published from the developer workstation 210 to the shared development server 220 as the software developer tests and updates the application. In a particular embodiment, the shared development server 220 may receive a second (e.g., updated) software deployment package from the developer workstation 210. The second software deployment package may include or may have been pre-configured using the previously stored device-specific parameter values from the data store 212. The shared development server 220 may automatically update the application based on the second software deployment package without prompting the user regarding the destination-dependent parameters.

When the application is ready for production (e.g., ready to be released to the public), the application may be published to one or more web servers (e.g., including an illustrative web server 230). In a particular embodiment, the software developer uses the developer workstation 210 to publish the application to the web server 230. Device-specific parameter values for the web server 230 may be stored at the data store 212. Alternately, the application may be published to the web server 230 from the shared development server 220, and device-specific parameter values for the web server 230 may be stored at a data store 222 of the shared development server 220. In other embodiments, the data stores 212, 222 may be at other locations, may be combined into a single data store, or any combination thereof.

FIG. 3 is a diagram to illustrate a particular embodiment of a manifest file 300 represented in XML. In an illustrative embodiment, the manifest file 300 may be the manifest file 112 or the manifest file 123 of FIG. 1.

In a particular embodiment, published applications are represented by a computer directory structure. For example, as illustrated in FIG. 3, a root folder "MyApp" of an Internet information services (IIS) application may serve as an IIS application path. The root directory may include one or more sub-folders that include components of the application. For example, as illustrated in FIG. 3, the "MyApp" root folder may include an "App_pata" sub-folder to store application data, a "Media" sub-folder to store media, a "Modules" sub-folder to store modules, and a "Themes" sub-folder to store themes.

The manifest file 300 may also include security or access control list information for the application. For example, as illustrated in HG, 3, each sub-folder may be associated with a "Modify" permission. Alternately, one or more of the sub-folders may have other permission values (e.g., "Read-only"). The manifest file 300 may further include or identify a database provider. For example, as illustrated in FIG. 3, an "install.sql" script may be executable at publishing destinations to create and update databases or database connections that may be used by the application.

FIG. 4 is a diagram to illustrate a particular embodiment of a parameters file 400 represented in XML. In an illustrative embodiment, the parameters file 400 may be the parameters file 114 or the parameters file 124 of FIG. 1.

The illustrated parameters file 400 FIG. 4 includes information for eight destination-dependent parameters having the names "Application Path," "SetAclParameter," "Database Server," "Database Name," "Database Username," "Database Password," "Settings Data Provider for SQL," and "Settings Data Connection String for SQL." It should be noted that information associated with any number of destination-dependent parameters may be included in a parameters file. The parameters file 400 may also include one or more of a description, a default value, and tag(s) for each destination-dependent parameter. For example, the "Application Path" parameter may have a description "Full site path where you, would like to install your application (i.e. Default Web Site/MyApp)," a default value "Default Web Site/MyApp," and a tag "iisapp." in a particular embodiment, the name, the description, the default value, and/or the tags) of a parameter are used to construct a user interface that includes a prompt to accept the default value or to provide a different device-specific value for the parameter.

FIG. 5 is a diagram to illustrate a particular embodiment of destination-specific parameter values 500 corresponding to the parameters file 400 of FIG. 4.

For example, as illustrated in FIG. 5, the application path parameter may have a value "Default Web Site/wordwrite," the database server parameter may have a value "localhost," (e.g., indicating that the publication destination in question has a local copy of the database), the database name parameter may have a value "wordwrite," the database user name parameter may have a value "wordwriteuser," and the database password parameter may have a value "mydbpassword."

The parameter values 500 may also include one or more encrypted values. In a particular embodiment, the encrypted values are represented as key-value pairs. For example, the illustrated parameter values 500 include four encrypted values having keys "Key 1," "Key 2," "Key 3," and "Key 4." The parameter values 500 may also include a package globally unique identifier (GUID). The package GUID may identify the software deployment package whose installation resulted in the parameter values 500.

Figure 6:
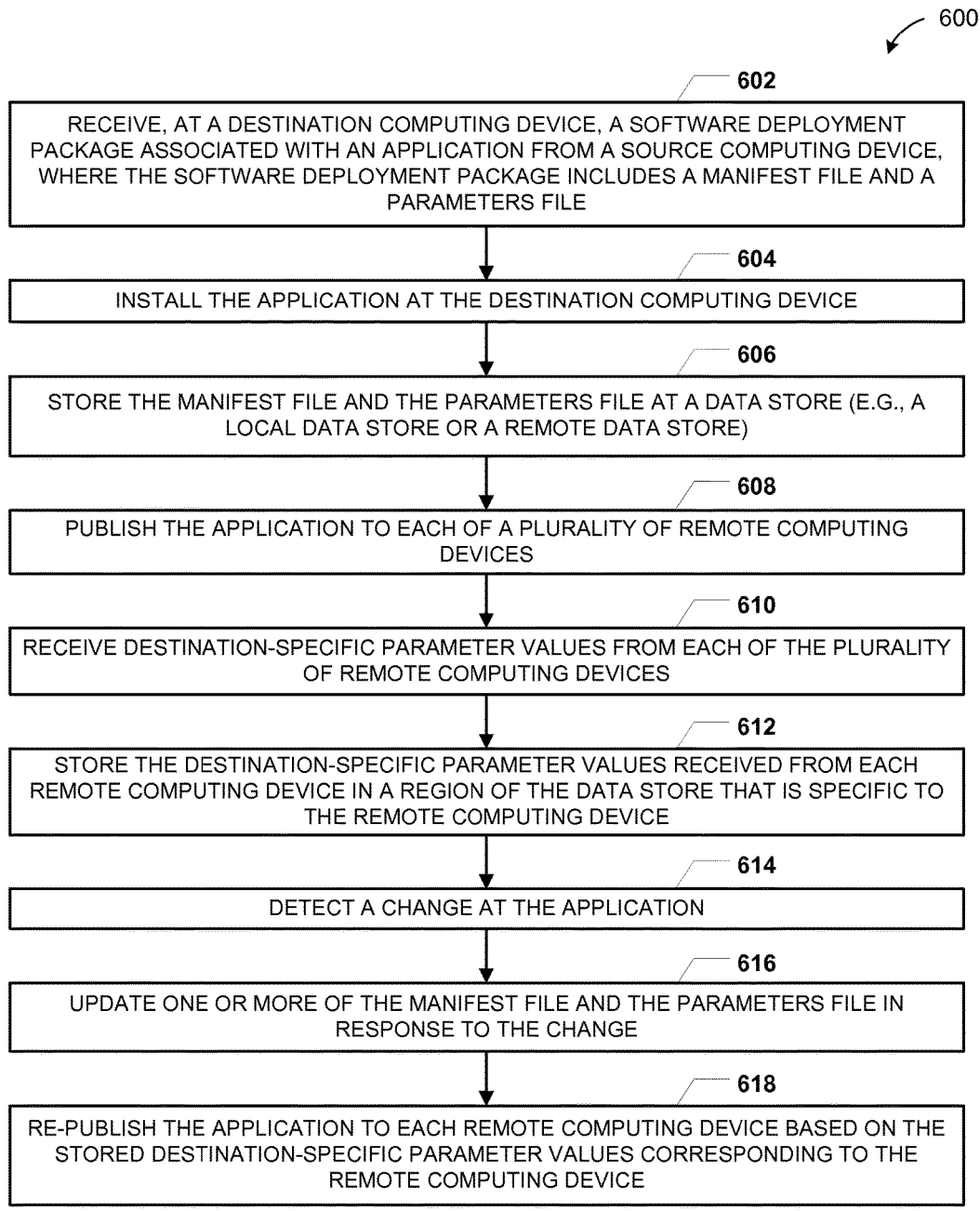
FIG. 6 is a flow diagram to illustrate a particular embodiment of a method of publishing an application to multiple computing devices.

FIG. 6 is a flow diagram to illustrate a particular embodiment of a method 600 of publishing an application to multiple computing devices. In an illustrative embodiment, the method 600 may be performed at the system 100 of FIG. 1 or the system 200 of FIG. 2.

The method 600 may include receiving, at a destination computing device, a software deployment package associated with an application from a source computing device, at 602. The software deployment package may include a manifest file and a parameters file. For example, in FIG. 1, the host computing device 120 may receive the software deployment package 110, which includes the manifest file 112 and the parameters file 114.

The method 600 may also include installing the application at the destination computing device, at 604, and storing the manifest file and the parameters file at a data store, at 606. The data store may be a local data store or a remote data store. For example, in FIG. 1, the host computing device 120 may install the application and may store the manifest file 123 and the parameters file 124 at the data store 121.

The method 600 may further include publishing the application to each of a plurality of remote computing devices, at 608, and receiving destination-specific parameter values from each of the plurality of remote computing devices, at 610. For example, in FIG. 1, the host computing device 120 may publish the application to the remote computing devices 130 and 140. The host computing device 120 may receive the first parameter values 126 from the first remote computing device 130 and the second parameter values 128 from the second remote computing device 140.

The method 600 may include storing the destination-specific parameter valves received from each remote computing device in a region of the data store that is specific to the remote computing device, at 612. For example, in FIG. 1, the first parameter values 126 may be stored in the first sub-record 125 and the second parameter values 128 may be stored in the second sub-record 127.

The method 600 may also include detecting a change in the application, at 614, and updating one or more of the manifest file and the parameters file in response to the change, at 616. For example, in FIG. 1, the host computing device 120 may update one or more of the manifest file 123 and the parameters file 124 in response to the change.

The method 600 may further include re-publishing the application to each remote computing device based on the stored destination-specific parameter values corresponding to the remote computing device, at 618. For example, in FIG. 1, the host computing device 120 may re-publish the application to the remote computing devices 130, 140. Application components transmitted to the first remote computing device 130 may include or may be pre-configured based on the first parameter values 126. Application components that are transmitted to the second remote computing device 140 may include or may be pre-configured based on the second parameter values 128. For example, a database connection string for the first remote computing device 130 may be pre-configured to point to a local database instance at the first computing device, and a database connection string for the second remote computing device 140 may be pre-configured to point to a remote database instance accessible via the Internet.

Figure 7:
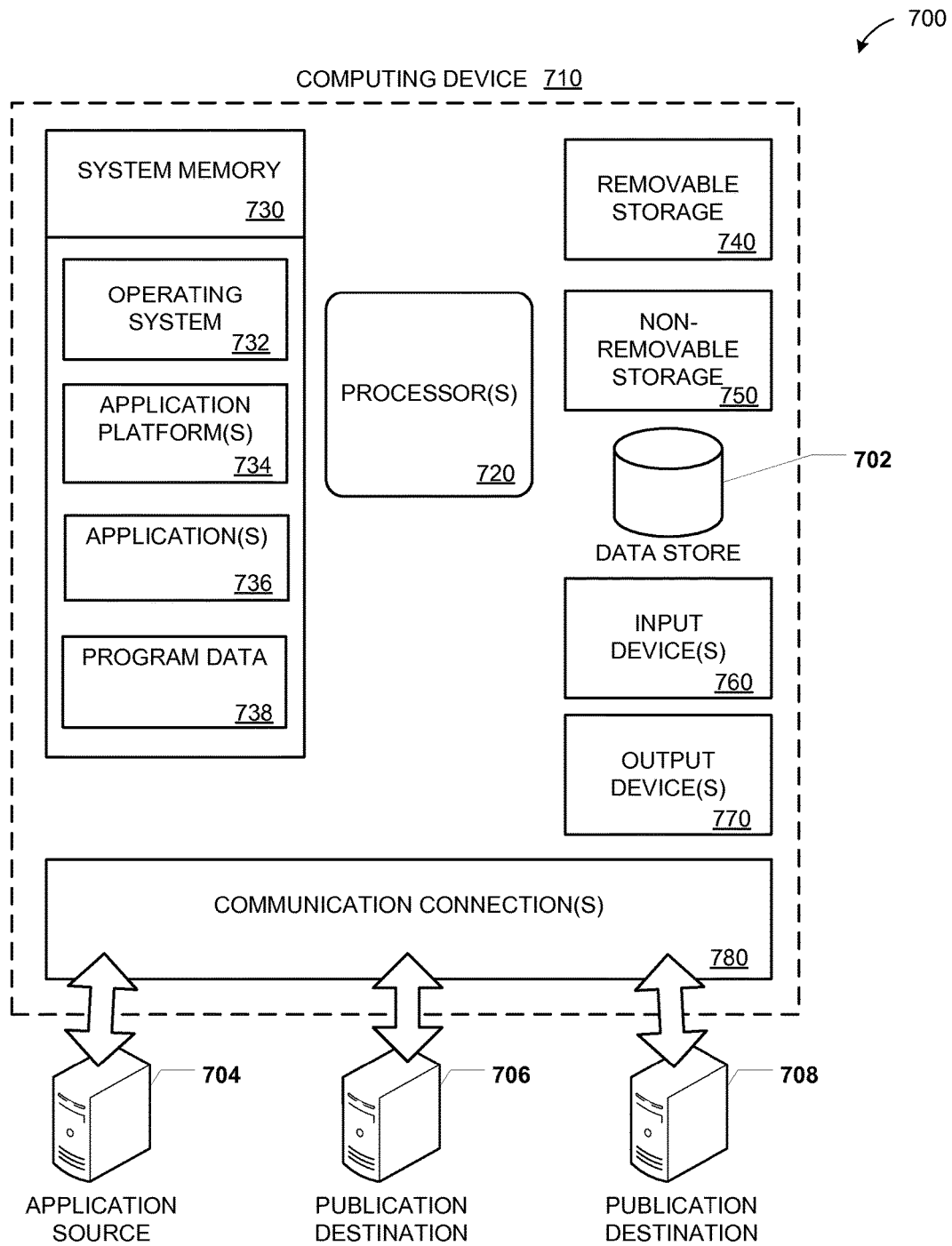
FIG. 7 is a block diagram of a computing environment including a computing device operable to support embodiments of computer-implemented methods, computer program products, and system components as illustrated in FIGS. 1-6.

FIG. 7 shows a block diagram of a computing environment 700 including a computing device 710 operable to support embodiments of computer-implemented methods, computer program products, and system components according to the present disclosure. For example, the computing device 710 or components thereof may include, implement, or be included as a component of the system 100 of FIG. 1 or the system 200 of FIG. 2.

The computing device 710 includes at least one processor 720 and a system memory 730. For example, the computing device 710 may be a desktop computer, a laptop computer, a tablet computer, a mobile phone, a server, or any other fixed or mobile computing device. Depending on the configuration and type of computing device, the system memory 730 may be volatile (such as random access memory or "RAM"), non-volatile (such as read-only memory or "ROM," flash memory, and similar memory devices that maintain stored data even when power is not provided), non-transitory, or some other memory. The system memory 730 may include an operating system 732, one or more application platforms 734, one or more applications, and program data 738.

The computing device 710 may also have additional features or functionality. For example, the computing device 710 may also include removable and/or non-removable additional data storage devices, such as magnetic disks, optical disks, tape, and memory cards. Such additional storage is illustrated in FIG. 7 by removable storage 740 and non-removable storage 750. Computer storage media may include volatile and/or non-volatile storage and removable and/or non-removable media implemented in any technology for storage of information, such as computer-readable instructions, data structures, program components, or other data. The system memory 730, the removable storage 740, and the non-removable storage 750 are each examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 710. Any such computer storage media may be part of the computing device 710. In a particular embodiment, the computing device 710 also includes a data store 702. For example, the data store may be the data store 121 of FIG. 1, the data store 212 of FIG. 2, or the data store 222 of FIG. 2. The data store 702 may be implemented as a separate storage device or as part of the removable storage 740, the non-removable storage 750, or both.

The computing device 710 may also have input device(s) 760, such as a keyboard, mouse, pen, voice input device, touch input device, etc. connected via one or more input interfaces. Output device(s) 770, such as a display, speakers, printer, etc. may also be included and connected via one or more output interfaces.

The computing device 710 also contains one or more communication connections 780 that allow the computing device 710 to communicate with other computing devices over a wired or a wireless network. For example, the one or more communication connections 780 may represent an interface that communicates with the other computing devices via a network. In a particular embodiment, the communication connections 780 enable the computing device 710 to communicate with one or more application sources (e.g., an illustrative application source 704) and one or more publication destinations (e.g., illustrative publication destinations 706, 708). In a particular embodiment, the data store 702 is external to the computing device 710 and is accessible via the communication connections 780.

It will be appreciated that not all of the components or devices illustrated in FIG. 7 or otherwise described in the previous paragraphs are necessary to support embodiments as herein described. For example, the removable storage 740 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is clamed is:

1. A computer-implemented method, comprising:
receiving an application to be installed in a remote computing device;
receiving and storing a manifest file and a parameters file associated with the application, as a record in a data store, wherein the manifest file identifies components of the application and the parameters file identifies configuration settings of the application;
publishing the application to the remote computing device by transmitting the components of the application identified by the manifest file to be installed on the remote computing device based on the configuration settings in the parameter file;
receiving parameter values from the remote computing device, the parameter values (i) being received from a user at the remote computing device during an initial installation of the application on the remote computing device and (ii) identifying destination-dependent configuration settings related to configuration of the initial installation of the application at the remote computing device;
storing, by a host computing device, the received parameter values in the data store as a sub-record that is specific to the remote computing device;
detecting a change in the application, the change including an update to a database used by the application, an addition of a new database, or a modification of source code of the application;
generating, by the host computing device, a pre-configured application by configuring the application with the detected change based on the parameter values received from the user at the remote computing device during the initial installation of the application on the remote computing device and stored as the sub-record in the data store and specific to the remote computing device, prior to re-publishing the application to the remote computing device; and
re-publishing the application with the detected change to the remote computing device by transmitting the generated pre-configured application to the remote computing device without prompting the user for the destination-dependent configuration settings related to installation of the application at the remote computing device.

2. The method of claim 1, further comprising:
in response to the detected change in the application, automatically updating at least one of the manifest file or the parameters file at the data store in response to the change.

3. The method of claim 2, wherein re-publishing the application includes re-publishing the application to the remote computing device without prompting a user of the remote computing device for the parameter values identifying destination-dependent configuration settings for installing the republished application at the remote computing device.

4. The method of claim 1, further comprising:
receiving the application from an application source; and
installing the application at a computing device configured to publish the application to the remote computing device.

5. The method of claim 4, wherein the data store is located at the computing device.

6. The method of claim 4, wherein the data store is remote to the computing device.

7. The method of claim 1, wherein the data store is accessible by the remote computing device via an application programming interface (API).

8. The method of claim 1, wherein receiving the parameter values from the remote computing device includes receiving the parameter values provided by a user of the remote computing device.

9. The method of claim 1, wherein the one or more components include one or more source code files associated with the application, one or more database identifiers of one or more databases associated with the application, one or more access control lists (ACLs) associated with the application, an application provider to transfer application files to a publishing destination, a database provider to transfer database content to the publishing destination, or any combination thereof.

10. The method of claim 1, wherein the parameter values include at least one of a key, a database location, or an application path.

11. The method of claim 1, wherein the parameters file is useable to generate, at a user interface of the remote computing device, a prompt for the parameter values and to transmit received parameter values to the data store.

12. The method of claim 1, further comprising:
transmitting the components of the application identified by the manifest file to a plurality of remote computing devices including the remote computing device; and
configuring the transmitted components of the application based on one or more of the parameters file and stored parameter values at the data store that are specific to each of the plurality of remote computing devices.

13. The method of claim 1, wherein the manifest file and the parameters file are each represented in extensible markup language (XML).

14. The method of claim 1, wherein the application comprises an Internet information services (IIS) web application.

15. A computer-readable storage device, that is not a signal, comprising instructions that, when executed by a computer, cause the computer to:
receive an application to be installed in a remote computing device;
receive and storing a manifest file and a parameters file associated with the application, as a record in a data store, wherein the manifest file identifies components of the application and the parameters file identifies configuration settings of the application;
publish the application to the remote computing device by transmitting the components of the application identified by the manifest file to be installed on the remote computing device based on the configuration settings in the parameter file;
receive parameter values from the remote computing device, the parameter values (i) being received from a user at the remote computing device during an initial installation of the application on the remote computing device and (ii) identifying destination-dependent configuration settings related to configuration of the initial installation of the application at the remote computing device;

store, by a host computing device, the received parameter values in the data store as a sub-record that is specific to the remote computing device;

detect a change in the application, the change including an update to a database used by the application, an addition of a new database, or a modification of source code of the application;

generate, by the host computing device, a pre-configured application by configuring the application with the detected change based on the parameter values received from the user at the remote computing device during the initial installation of the application on the remote computing device and stored as the sub-record in the data store and specific to the remote computing device, prior to re-publishing the application to the remote computing device; and re-publish the application with the detected change to the remote computing device by transmitting the generated pre-configured application to the remote computing device without prompting the user for the destination-dependent configuration settings related to installation of the application at the remote computing device.

16. The computer-readable storage device of claim 15, not being the signal, wherein:
the one or more destination-dependent configuration settings include one or more of an application path, a database server, a database name, a database password, a data provider, or a data connection string applicable to installing the application on the destination computing device.

17. The computer-readable storage device of claim 15, not being the signal, wherein the one or more destination-dependent configuration settings includes at least one of a key, a database location, or an application path.

18. A computer system, comprising:
a processor; and
a memory storing instructions executable by the processor to:
receive an application to be installed in a remote computing device;
receive and storing a manifest file and a parameters file associated with the application, as a record in a data store, wherein the manifest file identifies components of the application and the parameters file identifies configuration settings of the application;

publish the application to the remote computing device by transmitting the components of the application identified by the manifest file to be installed on the remote computing device based on the configuration settings in the parameter file;

receive parameter values from the remote computing device, the parameter values (i) being received from a user at the remote computing device during an initial installation of the application on the remote computing device and (ii) identifying destination-dependent configuration settings related to configuration of the initial installation of the application at the remote computing device;

store, by a host computing device, the received parameter values in the data store as a sub-record that is specific to the remote computing device;

detect a change in the application, the change including an update to a database used by the application, an addition of a new database, or a modification of source code of the application;

generate, by the host computing device, a pre-configured application by configuring the application with the detected change based on the parameter values received from the user at the remote computing device during the initial installation of the application on the remote computing device and stored as the sub-record in the data store and specific to the remote computing device, prior to re-publishing the application to the remote computing device; and re-publish the application with the detected change to the remote computing device by transmitting the generated pre-configured application to the remote computing device without prompting the user for the destination-dependent configuration settings related to installation of the application at the remote computing device.

19. The computer system of claim 18, wherein the one or more destination-dependent configuration settings include at least one of a key, a database location, or an application path.

20. The computer system of claim 18, wherein the stored parameter values are encrypted.

* * * * *